Aug. 8, 1967　　　M. T. WORKS ET AL　　　3,334,653
VALVE
Filed Dec. 22, 1964　　　　　　　　　　　　　2 Sheets-Sheet 1
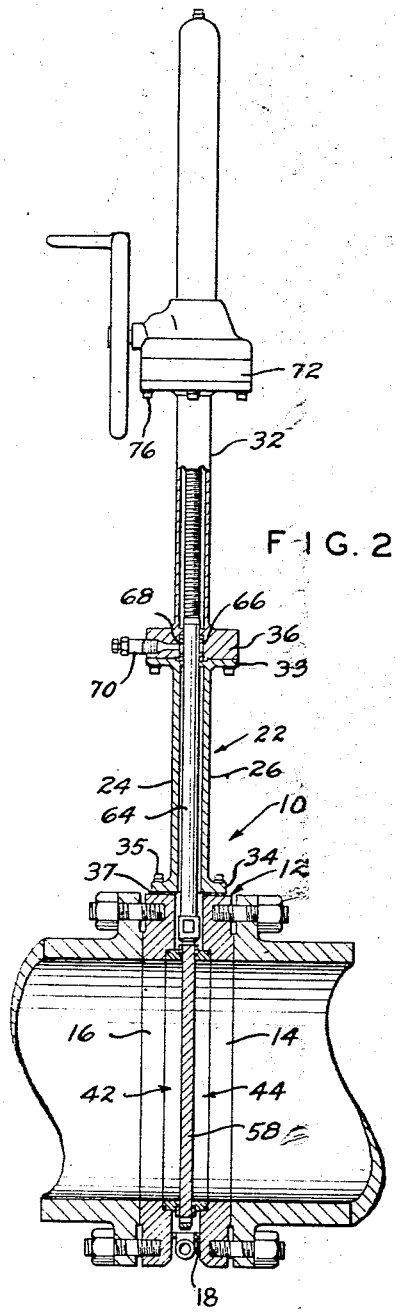
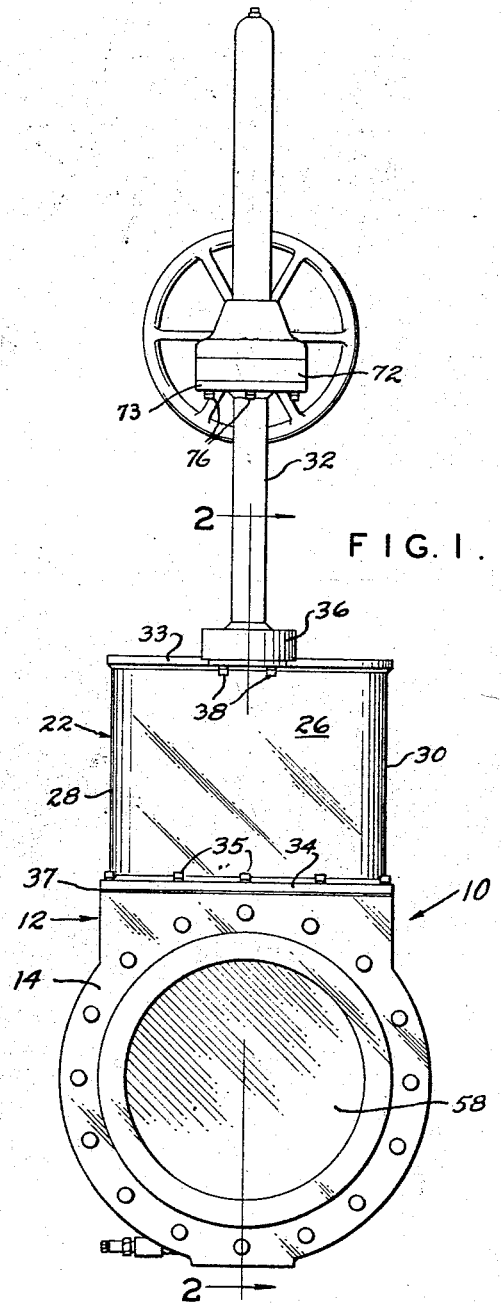
INVENTORS
MADDEN T. WORKS
CLIFFORD E. ANDERSON
BY
*James D. Jackson*
AGENT

INVENTORS
MADDEN T. WORKS
CLIFFORD E. ANDERSON
BY
AGENT

United States Patent Office 3,334,653
Patented Aug. 8, 1967

3,334,653
VALVE
Madden T. Works and Clifford E. Anderson, Houston, Tex., assignors to ACF Industries, Incorporated, New York, N.Y., a corporation of New Jersey
Filed Dec. 22, 1964, Ser. No. 420,261
17 Claims. (Cl. 137—546)

This application is directed generally to gate valves and more specifically to nonconduit type gate valves for controlling the flow of fluid through a pipe.

Nonconduit gate valves have not achieved the popularity of conduit gate valves primarily because of the difficulty experienced in maintaining the proper positioning of the seats or seat assemblies within the seat recesses. The difficulty arises due to the fact that the gate of a nonconduit type gate valve is removed or substantially removed from its position between the valve seats in the open position of the valve, thereby allowing movement of the valve seats toward one another. When the seats are allowed to move in this manner, sediment within the valve can be accumulated in the seat recesses behind the seats. Insertion of the gate member between the seats as the valve is subsequently closed will cause binding of the gate and seats because the deposit of sediment in the seat recesses behind the seats will prevent them from moving fully into their recesses. Binding of the gate and seats could result in scoring or otherwise damaging the gate or seats which would involve extensive valve repair.

Past attempts to provide nonconduit type valve constructions having seats which maintain a predetermined minimum seat spacing within the seat recesses have not met with success. For example, nonconduit type gate valves have been provided with seat retainer members which are fixed to the interior wall structure of the valve body and which interfit with grooves formed in the exterior periphery of the seat rings to prevent excessive movement of the seats. To assure that each of the seats would be allowed to contact the gate for the establishment of a seal therewith, because of manufacturing tolerances, it was necessary that each of the seats be allowed to move slightly beyond the plane established by the sealing surface of the gate. It is apparent that even though the movement of the seats was slight, a small gap would be allowed behind the seats when the gate was in the open position and sediment could fill this space. Subsequent compaction of even this small amount of sediment accumulation was found to render the valve inoperative in due time because of insufficient spacing of the seats.

Conduit gate valves, however, inherently provide for the maintenance of minimum seat spacing because a substantial portion of the gate is interposed between the seats at all times. For example, the Eckert Patent 3,025,-033 illustrates a gate valve in FIGURE 1 in the open position thereof. The seats illustrated in the Eckert patent will not be permitted to move out of the recesses because the gate prevents such movements at all times.

Nonconduit type gate valves have also been constructed with seat members fitted into and carried by the gate member for sealing engagement with planar parallel sealing surfaces defining opposing walls of the valve chamber. This type of construction is considered impractical, however, because of the complicated nature of the gate and the preciseness required in construction of the valve body.

Accordingly, it is a primary object of the present invention to provide a novel nonconduit type gate valve having movable seat members which are positively adapted for the maintenance of predetermined minimum spacing therebetween.

It is a further object of this invention to provide a novel valve construction permitting the manufacture of large pipeline valves without excessive weight or bulk.

An even further object of this invention contemplates the provision of a novel gate valve, having a nonconduit slab type gate and floating seat assemblies positioned within the valve body, the operation of which is unaffected by deposits of sediment within the valve.

It is among the objects of this invention to provide a novel gate valve having a nonconduit type slab gate member and floating seats within the valve chamber, which are adapted in the closed position of the valve to be moved downstream as a unit by the pressurized fluid controlled by the valve.

It is an even further object of this invention to provide a novel valve construction employing seat assembly units having a sealing member in a groove therein and means within the valve chamber having the dual function of maintaining a predetermined minimum spaced relation between the seats and locking the sealing member within the groove.

Briefly, the invention comprises a nonconduit type slab gate valve, the valve body and bonnet portions of which may be cast or fabricated as desired. The valve includes a pair of opposed floating seat assemblies which are retained within seat recesses within the valve body and are disposed on opposite sides of a nonconduit type gate member. The valve is provided with a movable seat spacer member which is disposed within the valve chamber and interposed between the seat assemblies, and which is adapted to maintain a predetermined minimum spacing between the seat assemblies as the gate is removed from its position between the seat assemblies upon being moved to the open position of the valve. Since the seat assemblies are maintained in this predetermined minimum spaced condition, accumulation of sediment in the seat recesses behind the seats cannot impair the operation of the valve. The valve is provided with bottom outlet drain structure and the spacing structure is so arranged that sediment within the valve is directed to flow to the outlet drain structure where it is removed from the valve.

Other and further embodiments of the invention will become obvious upon an understanding of the illustrated embodiments about to be described or will be indicated in the appended claims and various advantages not referred to herein will become apparent to one skilled in the art upon employment of the invention in practice.

Preferred embodiments of the invention have been chosen for purpose of illustration and description and are shown in the accompanying drawings, forming a part of the specification wherein;

FIGURE 1 is a front elevational view of the invention.

FIGURE 2 is a partial sectional view of the invention of FIGURE 1.

Figure 4:
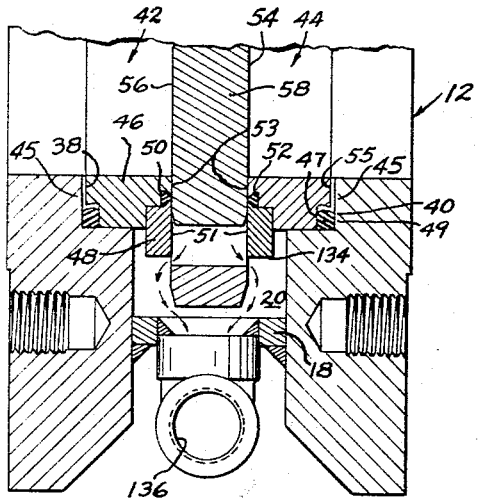
FIGURE 4 is a partial sectional view of the invention taken generally along lines 4—4 in FIGURE 3.

Referring now to the drawings for a better understanding of the invention, a valve 10 is illustrated in FIGURES 1 and 2, comprising a valve body 12 which is formed of a pair of generally planar structural members 14 and 16, which are interconnected by an annular substantially U-shaped web portion 18 fixed to the members 14 and 16. The valve body 12 may be formed by casting or by fabrication, as desired. The U-shaped web portion 18 maintains the members 14 and 16 in substantially parallel relationship. The structural members 14 and 16 cooperate with the web 18 to define an open ended valve chamber 20. A bonnet member 22, which is formed by substantially parallel planar side walls 24 and 26 which are interconnected by end walls 28 and 30, has its upper and lower ends formed by flanges 33 and 34 respectively. A series of bolts 35 extends through openings in the lower flange 34 and serves to retain the bonnet 22 on the valve 10 about the open end of the valve chamber. The bonnet 22 effectively forms a closure for the valve chamber 20 and serves as a housing for the valve member in the open position thereof. A gasket 37 is interposed between the bonnet flange 34 and the valve body to effect a fluidtight seal therebetween. A yoke tube 32, having upper and lower flanges 73 and 36 respectively, is fixed to the bonnet 22 of the valve 10 by a series of bolts 38, which extend through apertures formed in the upper flange 33 of the bonnet 22 and into the lower flange 36 of the yoke tube 32.

Each of the planar structural members 14 and 16 is provided with an annular internal bore about the respective port or flow passage therein, which, when in assembly, define opposed seat recesses 38 and 40. As illustrated in detail in FIGURES 4 and 5, each of the seat recesses 38 and 40 retain annular seat assemblies, illustrated generally at 42 and 44 respectively, in such a manner that the seat assemblies are allowed axial and radial movement within the seat recesses. The seat assemblies 42 and 44 are each identical and comprise an annular seat member 46 and an annular retainer member 48, which cooperate to define a face seal retaining groove 50. The retainer member 48 of each of the seat assemblies extends a considerable distance beyond the exterior peripheral surface of the seat member 46 and includes a substantially planar surface, as illustrated at 51 in FIGURE 4, which is coplanar with a substantially planar surface 53 formed on the seat members 46 to form the sealing face of the seat assembly. Within the groove 50 is retained an annular sealing member 52, generally formed of a suitable elastomeric sealing substance such as synthetic rubber or the like, for example, and having a small sealing portion thereof extending beyond the sealing face of the seat assembly for sealing engagement with substantially planar surfaces 54 and 56 of a gate member 58, which is interposed between the seat assemblies in the closed position of the valve. The back face 45 of the seat ring 46 is formed with a recess 47 which retains a back face sealing member 49 also formed of elastomeric sealing substance. The back face sealing member is larger in cross-sectional dimension than the depth of the recess 47, thereby causing the sealing member 49 to sealingly engage the radial wall 55 of the seat recess at all times.

Figure 3:
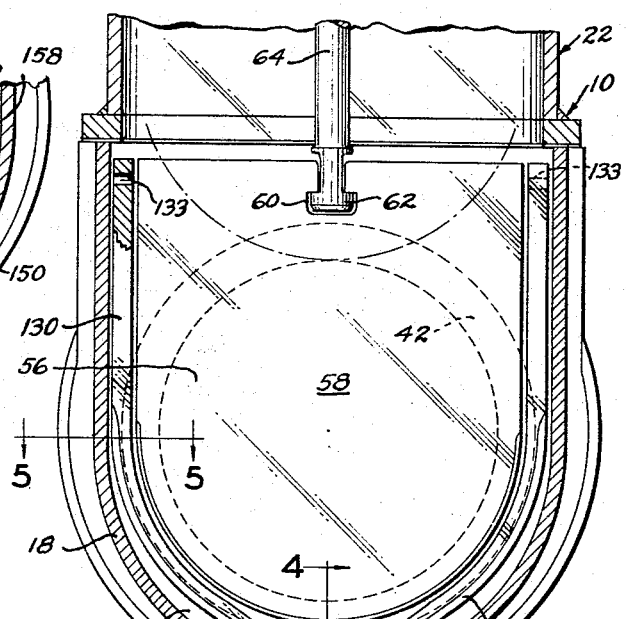
FIGURE 3 is a partial sectional view of the invention of FIGURE 2, illustrating the gate, spacer and drain fitting in full.

The gate or valve member 58 is a nonconduit type or nonported gate, which in the closed position of the valve is interposed between the seat assemblies 42 and 44, in sealing relation therewith, to prevent the flow of fluid through the valve, and in the upper position is retracted into the bonnet 22, as indicated in broken lines in FIGURE 3. The slab or parallel sealing surfaced type gate member 58 is formed to generally conform to the shape of the valve chamber 20 and is provided at its upper end with a slot 60, which receives the lower end 62 of an operating stem 64. As indicated in FIGURE 2, the stem 64 extends through a packing chamber 66, which is formed by enlarged bores in the flanges 33 and 36, and which retains a packing assembly 68 for the establishment of a fluidtight seal about the stem 64. A packing adjustment fitting 70 is fixed to the flange 36 and is in fluid communication with the packing chamber 66 and is operative to force packing material within the packing chamber 66 to repressurize the packing assembly should leakage develop in the stem packing.

The valve 10 is provided with a stem operating mechanism 72, which is fixed to the upper flange 73 of the yoke tube 32 by a series of bolts 76. The particular operator employed for imparting vertical movement to the stem 64 might be a gear operator, as illustrated in FIGURES 1 and 2, or it might be any one of numerous suitable commercially available manual or power operators, without departing from the spirit or scope of this invention.

Figure 5:
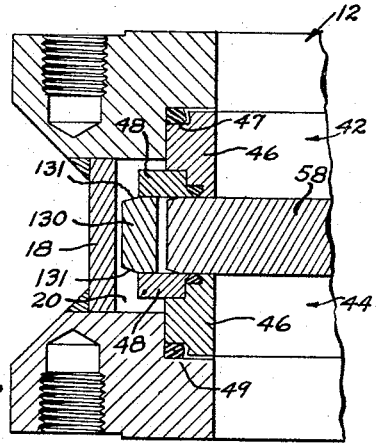
FIGURE 5 is a partial sectional view of the invention taken along lines 5—5 in FIGURE 3.

As illustrated in detail in FIGURES 3, 4 and 5, and forming an important part of this invention, a generally U-shaped seat assembly spacer member 130 is loosely positioned within the valve chamber and has opposing portions thereof interposed between the seat assemblies 42 and 44. The seat spacer member 130 is of substantially the same thickness dimension as the thickness of the gate 58, so that the minimum spacing between the seat assemblies will never be less than the thickness dimension of the gate. The minimum spacing between the sealing faces of the seat assemblies will generally be the same dimension as the thickness of the gate. As illustrated in FIGURES 3 and 4, the spacer member 130 is provided with a generally flat base portion 132, which rests on the U-shaped or bottom portion of the web 18 in such a manner that it engages the web at two spaced locations. The uppermost surface of the base portion 132 of the spacer member 130 is disposed below the outer periphery 134 of the seat assemblies 42 and 44. The spacing of the base portion 132 of the spacer member, with respect to the seat assemblies and with respect to the web portion 18 of the valve body, defines flow paths which direct the flow of sediment within the valve chamber from between the seat assemblies 42–44 to the lowermost portion of the valve body, as indicated by arrows in FIGURE 4.

The spacer member 130 (FIGURE 4) is provided with opposed beveled surfaces 131, which serve to cam or force the seat assemblies into their seat recesses upon insertion of the spacer member into the valve chamber. The spacer 130 is provided with lift openings 133 near the upper extremity of the arms thereof, which allow the insertion of hooks for the purpose of removing the spacer member from the valve chamber.

As pointer out above, the retainer member 48 of each of the seat assemblies extends substantially radially beyond the exterior peripheral surface of the seat ring 46. An important concept of this invention involves the dual purpose served by the seat spacer member 130. The retainer member 48 of each of the seat assemblies has a sliding fit with the seat ring 46 and the seat spacer member 130 is adapted for engagement with only the retainer member 48 of each of the seat assemblies, as illustrated in FIGURE 5. It is apparent, therefore, that the spacer member 130, in addition to maintaining predetermined minimum spacing between the seat assemblies, also maintains the retainer members 48 in assembly with the respective seat members 46. Furthermore, the location of the engagement between the spacer member and the retainer prevents any possibility of the spacer member imparing movement of the gate or interfering with the seal between the gate and the seat assemblies.

A valve drain fitting 136 is fixed within an opening 138 in the web portion 18 of the valve body, and is in fluid communication with the valve body to drain off any accumulation of sediment within the lowermost portion of the valve chamber. Any of various acceptable drain fittings may be used in place of the drain fitting 136 without altering the spirit or scope of this invention. It is only necessary that the drain fitting 136 be manually operable by suitable valve structure to allow the bleeding of fluid and sediment from the valve chamber of the valve body.

During assembly of the valve, the seat assemblies 42 and 44 are lowered into the valve chamber 20 through the open end of the valve chamber and are placed within their respective seat recesses. Since the seat assemblies are slidably fitted within the seat recesses, they may be manually inserted into the proper position within the valve seat without the aid of special seat installation tools or equipment as would be required if they were press-fitted into the recesses. The U-shaped seat spacing member 130 is then positioned within the valve chamber 20 in such a manner that the base portion 132 thereof rests on the web portion 18 of the valve body in the manner illustrated in FIGURE 3, and a pair of opposed curved portions of the U-shaped member 130 are interposed between the seat assemblies 42 and 44, as illustrated in FIGURES 3 and 5. The opposed beveled surfaces 131 formed on the seat spacing member 130 serve to cam the seat assemblies 42 and 44 into the proper position within their respective seat recesses to obtain a predetermined minimum spacing between the sealing faces of the seat assemblies. Prior to assembly of the seat spacer member 130 into its proper position within the valve, the spacing of the sealing faces of the seat assemblies will be less than the thickness of the spacer member because the back face sealing member 49 will be in its uncompressed condition and will extend axially beyond the back face of the seat assembly. As the spacer member 130 is inserted into its proper position within the valve chamber, the beveled surfaces 131 will engage the sealing faces of the seat assemblies and force the seat assemblies axially into their seat recesses, thereby compressing the back face sealing members 49 against the radial walls 55 of the seat recesses. The seat assemblies will be properly spaced after the spacer member 130 has been inserted into the position illustrated in FIGURES 3, 4 and 5. Since the seat spacing member 130 and the gate 58 are of substantially identical thickness, the aforesaid predetermined minimum spacing will be substantially the thickness of the gate 58. With the seat assemblies maintained in minimum spaced relationship by the spacing member 130, there will be allowed a slight clearance between the back face 45 of the respective seat assemblies and the radial wall of the seat recess. This clearance is for the purpose of allowing manufacturing tolerances. The back face sealing members of the seat assemblies, however, will be maintained in sealing engagement with either one or both the radial and circumferential walls defining the seat recesses.

The valve stem will be in assembly with the bonnet and operator portions of the valve prior to the assembly of the bonnet portion 22 to the body portion 12. The head portion 62 of the stem 64 is interengaged with the slot structure 60 in the gate 58 and the gate and bonnet structure are then assembled to the valve body as indicated in FIGURE 3.

As illustrated in broken lines in FIGURE 3, the gate member 58 in its uppermost position will be interposed between only the extreme upper portions of the seat assemblies 42 and 44. Even though the gate member 58 is substantially removed from the valve body in the open position of the valve, the seat assemblies 42 and 44 are not allowed to move an excessive distance toward one another, because the seat spacing member 130 will always remain in the position illustrated in FIGURE 3, with the aforesaid opposed curved portions of the spacing member interposed between the seat assemblies, thereby maintaining the predetermined minimum spaced relationship between the seat assemblies. The spacing member 130 effectively prevents undesired movement of the seat assemblies partially outwardly of their seat recesses which would otherwise allow a harmful accumulation of sediment in the recesses behind the seat assemblies sufficiently to resist subsequent required movement of the seat assemblies into the proper position within their seat recesses. Minor accumulation of sediment behind the seat recesses, for example sediment deposited in the clearance allowed between the seats and the seat recesses, will not hamper operation of the valve. As long as a predetermined minimum distance, essentially equal to the gate thickness, is maintained between the sealing faces of the seat recesses, the gate member 58 may be successfully operated.

The spacer member will be prevented from moving beyond the upper end of the valve body both in the open and closed positions of the gate by the lower flange 34 of the bonnet 22, which will be engaged by the arms of the spacer member to prevent excessive vertical movement thereof. Excessive lateral shifting of the spacer member is effectively prevented by the web portion 18 of the valve body. The gate member, however, will reposition the spacer member if it should become shifted. Assuming that the spacer member has become laterally and vertically shifted to the maximum degree permitted by the valve body and bonnet construction, the curved lower extremity of the gate, upon movement of the gate to the closed position, will cam the spacer member 130 to its proper position within the valve chamber.

With the gate 58 retracted to its uppermost open position, there will be a tendency for sediment within the valve chamber to flow into the space formerly occupied by the gate. Since the base portion 132 of the spacing member 130 is disposed below the lower extremity of the seat assemblies, the sediment flowing into the space previously occupied by the gate will be directed to flow toward the drain fitting, as illustrated in FIGURE 4. The drain fitting 136 may be opened periodically to bleed off any accumulation of sediment from the valve body.

The spacer member 130, being interposed between the seat assemblies at all times, in essence results in the operation of the seat assemblies of nonconduit gate valves as if the valve had a conduit type gate. The seat assemblies, gate and seat spacing member 130 will be allowed to move as a unit in the closed position of the valve. The valve 58, being closed, will respond to the pressure of the fluid within the valve and will float downstream, thereby forcing the downstream seat member tightly against the radial surface of the seat recess. The upstream seat assembly, since its back face sealing member is larger in diameter than the diameter of the face sealing member 52, will be forced by the pressurized fluid to follow the gate 58 downstream and to maintain a fluidtight seal therewith. The back face seal of the upstream seat assembly will be expanded radially by the pressurized fluid to maintain a fluidtight seal between the seat assembly and the seat recess. The seat spacing member 130 will be forced in a downstream direction by the upstream seat member. Although the seat assemblies, gate and seat spacing member will be allowed to shift axially, it must be borne in mind that the amount of shifting will be slight, since it would be limited by the amount of clearance between the back face 45 of the valve and the radial wall of the seat recess.

Figure 6:
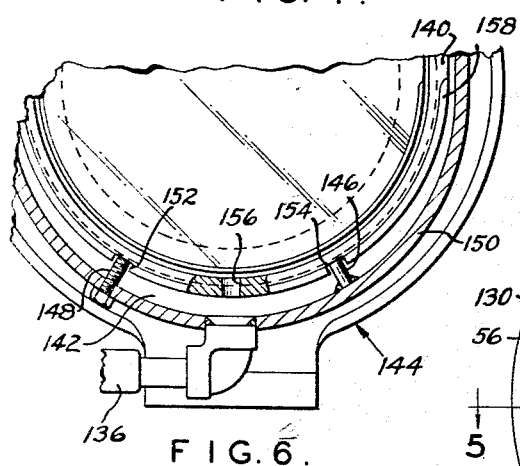
FIGURES 6 and 7 are partial sectional views of modified forms of the invention.

As illustrated in FIGURE 6, a modified embodiment of the invention includes a seat spacing member 140, which is loosely positioned within a valve chamber 142 of a valve 144. A pair of support members 146 and 148 is fixed to the web portion 150 of the valve 144, and serves to retain the spacing member 140 in spaced relation with respect to the web portion 150 of the valve 144. The spacing member 140 is provided with a pair of spaced recesses 152 and 154, which receive the support members 146 and 148 to maintain the spacing member 140 in the proper position within the valve chamber. The seat spacing member 140 is also provided with a bore or port 156, which serves to conduct the flow of sediment from the valve chamber to a drain fitting 136 fitted within the web portion 150 of the valve. The seat spacer member 140 is provided with opposed beveled surfaces 158, which serve to cam the seat assemblies into their proper minimum spaced positions within the seat recesses, as discussed above in regard to FIGURE 3.

Figure 7:
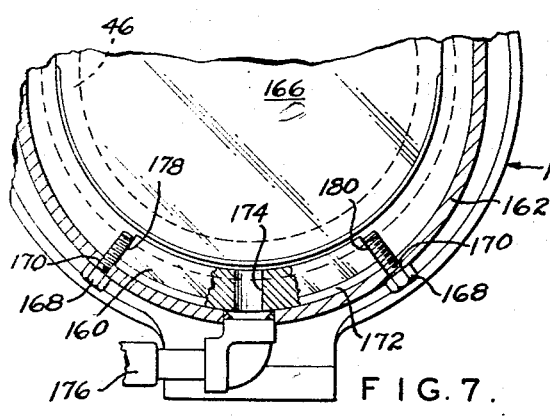

The seat spacer support members 146 and 148 may be provided either by welding a support to the web member 150, as indicated at the right portion of FIGURE 7, or the support may be provided by a bolt 148, which is threaded through and sealed by a threaded bore formed in the web 150, as indicated at the left of FIGURE 7. The seat assemblies and gate structures of the valve 144 will be essentially identical in structure and operation to those incorporated in the valve 10.

As illustrated in FIGURE 7, another modified embodiment of the invention includes a spacer member 160, which is a short curved segment and rests on the web portion 162 of the valve body 164. The spacer member 160 is of substantially the same thickness as the thickness dimension of the gate 166 and is prevented from shifting longitudinally within the valve body by a pair of bolts 168, which are threaded through threaded apertures 170 formed in the web portion 162 of the valve body. The spacer member 160 is formed with a pair of opposed beveled surfaces 172, which facilitate insertion of the spacer member 160 into the valve body. The beveled surfaces 172 engage the sealing faces of each of the seat assemblies and cam the seat assemblies into their proper position within the seat recesses, as discussed hereinabove in regard to FIGURE 3. The seat spacing member 160 is provided with a bore 174 through which sediment will be allowed to flow from the valve body to a sediment drain fitting 176 connected to the valve chamber through the web portion 162, for removal of accumulated sediment from the valve body. In addition to preventing longitudinal movement of the seat member 160, the bolts 168 also prevent vertical movement of the spacer member 160. As illustrated in FIGURE 7, the bolts 168 have an angular relationship one with the other and cooperate with a pair of end surfaces 178 and 180, having essentially the same angular relationship as the angular relationship of the bolts 168 to prevent undesired vertical movement of the seat spacer member 160 within the valve body. The seat spacer member 160 is not supported axially and, therefore, is allowed slight axial movement in the same manner as the seat spacer members 130 and 140 in FIGURES 3 and 6 respectively.

The seat spacer member 160 effectively maintains predetermined minimum spacing between the lower portions of the seat assemblies 42 and 44, to prevent undesired movement of the seat assemblies excessively toward one another. The upper portion of the seat assemblies 42 and 44 in the open condition of the valve, are maintained in proper spaced relation by the lower portion of the gate member, in the same manner illustrated broken lines in FIGURE 3.

In view of the foregoing, it is evident that we have produced a novel valve construction, incorporating a nonconduit type gate and floating seat assemblies, and including means for preventing insufficient spacing between the seat assemblies and preventing the valve from becoming inoperative due to the accumulation of sediment within the valve body. We have also provided novel construction for allowing the flow of sediment within the valve to the lowermost portion of the valve chamber and have provided drain construction for effectively removing deposited sediment from within the valve chamber. The invention, due to its novel design, allows the seat assemblies of nonconduit type gate valves to function essentially as seat assemblies of conduit type gate valves. The invention, therefore, is one well adapted to attain all of the objects hereinabove set forth, together with other advantages which are obvious and inherent from a description of the apparatus itself.

It will be understood that certain features and subcombinations are of utility and may be employed without reference to other features and subcombinations. This is contemplated by and is within the scope of the appended claims.

As many possible embodiments may be made of the invention without departing from the scope thereof, it is to be understood that all matter herein set forth or shown in the accompanying drawings is to be interpreted as illustrative and not in a limiting sense.

We claim:

1. A valve having a valve body formed with inlet and outlet ports and defining a valve chamber, a valve member disposed within the valve chamber and being movable between open and closed positions to control the flow of fluid through the valve, means for imparting movement to the valve member, a pair of spaced seat assemblies within the valve chamber disposed respectively about the inlet and outlet ports and having sealing faces thereof in sealing engagement with the valve member in the closed positions of the valve, spacer means of the same thickness as the thickness of said valve member disposed between said seat assemblies for maintaining precise predetermined spacing between said seat assemblies in the open position of the valve.

2. A valve as recited in claim 1, said last mentioned means being independent of the valve body, valve member and seat assemblies.

3. A valve as set forth in claim 2, said last mentioned means being loosely positioned within the valve body and being adapted for axial movement within said valve chamber.

4. A valve having a valve body formed with inlet and outlet ports and defining a valve chamber, a valve member disposed within the valve chamber and being movable between open and closed positions to control the flow of fluid through the valve, means for imparting movement to the valve member, a pair of spaced movable seat assemblies within the valve chamber disposed respectively about the inlet and outlet ports and having sealing faces thereof in sealing engagement with the valve member in the closed positions of the valve, spacer means loosely positioned within the valve chamber, said spacer means being of the same thickness as the thickness of said valve member and being interposed between said seat assemblies for maintaining precise predetermined minimum spacing between said seat assemblies in the open position of the valve.

5. A valve having a valve body formed with inlet and outlet ports and defining a valve chamber, a valve member disposed within the valve chamber and being movable between open and closed positions to control the flow of fluid through the valve, means for imparting movement to the valve member, a pair of spaced movable seat assemblies within the valve chamber disposed respectively about the inlet and outlet ports and having sealing faces thereof in sealing engagement with the valve member in the closed positions of the valve, spacer means loosely positioned within the valve chamber, said spacer means being supported at the lower portion of the valve body and maintaining precise predetermined minimum spacing between said seat assemblies in the open position of the valve, said seat members, said gate and said spacer means adapted to be moved downstream as a unit by said fluid in the closed position of said valve.

6. A valve having a valve body formed with inlet and outlet ports and defining a valve chamber, a valve member disposed within the valve chamber and being movable between open and closed positions to control the flow of fluid through the valve, means for imparting movement to the valve member, a pair of spaced movable seat assemblies within the valve chamber disposed respectively about the inlet and outlet ports and having sealing portions thereof in engagement with the valve member in the closed positions of the valve, spacing means loosely positioned within the valve chamber and being supported at the lower portion of said valve chamber, said spacing means interposed between said seat assemblies for maintaining precise predetermined minimum spacing between said seat assemblies in the open position of the valve, said seat assemblies, said gate and said spacing means adapted to be moved downstream as a unit by said fluid in the closed position of said valve.

7. In a gate valve having a valve body, a pair of seat assemblies disposed in spaced relation within the valve body, a valve member in the valve body and movable from a closed position where the valve member is positioned between the seat assemblies to an open position where the valve member is substantially removed from between said seat assemblies, means for moving the valve member, spacing means being of the same thickness as the thickness of said valve member and disposed between said seat assemblies to maintain a predetermined minimum spacing between said seat assemblies.

8. In a gate valve having a valve body, a pair of seat assemblies disposed in spaced relation within the valve body, a valve member having parallel sealing surfaces being disposed within the valve body and movable from a closed position where the valve member is positioned between the seat assemblies to an open position where the valve member is substantially removed from between said seat assemblies, means for moving the valve member, spacing means of the same thickness as the thickness of said valve member disposed within the valve body and having a portion thereof disposed between said seat assemblies to maintain a predetermined minimum spacing between said seat assemblies, in the closed position of said valve, said seat member, valve member and spacing member being movable as a unit by the pressurized fluid controlled by the valve.

9. In a gate valve having a valve body, a pair of seat assemblies disposed in spaced relation within the valve body, a valve member in the valve body and movable from a closed position where the valve member is positioned between the seat assemblies to an open position where the valve member is substantially removed from between said seat assemblies, means for moving the valve member, spacing means of the same thickness as the thickness of said valve member being loosely positioned within the valve body and having a portion thereof disposed between said seat assemblies at the lower portion thereof to maintain a predetermined minimum spacing between said seat assemblies, a sediment drain fitting in fluid communication with the interior of the valve body, said spacing means having a portion thereof extending below said seat members and defining a drain path for directing the flow of sediment within the valve toward the sediment drain fitting.

10. In a gate valve having a valve body, a pair of seat assemblies disposed in spaced relation within the valve body, a valve member having parallel sealing surfaces disposed within the valve body and movable from a closed position where the valve member is positioned between the seat assemblies to an open position where the valve member is substantially removed from between said seat assemblies, means for moving the valve member, a generally U-shaped seat spacer loosely positioned within the valve body and having a portion thereof disposed between said seat assemblies at the lower portion thereof to maintain a predetermined minimum spacing between said seat assemblies in the open position of said valve, a sediment drain fitting in fluid communication with the interior of the valve body, said seat spacer having a lower portion thereof defining a base which rests on the lower wall of the valve body adjacent said drain fitting, said base extending below the seat assemblies and defining at least one drain passage to the drain fitting.

11. In a gate valve having a valve body, a pair of seat assemblies disposed in spaced relation within the valve body, a valve member having parallel sealing surfaces disposed within the valve body and movable from a closed position where the valve member is positioned between the seat assemblies to an open position where the valve member is substantially removed from between said seat assemblies, means for moving the valve member, a generally U-shaped seat spacer of the same thickness as the thickness of said valve member loosely positioned within the valve body and having a portion thereof disposed between the lower portion of said seat assemblies to maintain a predetermined minimum spacing between said seat assemblies, a sediment drain fitting in fluid communication with the interior of the valve body, said seat spacer having the lower portion thereof maintained in spaced relation with the lower wall of the valve body and having an opening formed therein for directing the flow of sediment from the valve body to the drain fitting.

12. A gate valve comprising a pair of spaced parallel slab portions each formed with a circular port and having means adapting the slab portions for connection to a pipeline, wall means interconnecting said slab portions and defining an open ended valve chamber, a removable bonnet forming a closure for the open end of said valve chamber, seat recesses formed in each of said slab portions about said circular ports, seat assemblies movably disposed within said seat recesses, a gate member having generally planar parallel sealing surfaces thereon positioned within said valve chamber and being movable from a closed position where said gate member is positioned between the seat assemblies to block the flow of fluid through the valve to an open position where the gate member is substantially retracted within said bonnet to allow the flow of fluid through the valve, means for moving the gate, seat spacer means of the same thickness as the thickness of said gate member being positioned within said valve chamber and having at least a portion thereof interposed between and in contact with said seat assemblies, said spacer means adapted to maintain a predetermined minimum spaced relation between said seat assemblies.

13. A gate valve comprising a pair of spaced parallel slab portions each formed with a circular port and having means adapting the slab portions for connection to a pipeline, wall means interconnecting said slab portions and defining an open ended valve chamber, a removable bonnet forming a closure for the open end of said valve chamber, seat recesses formed in each of said slab portions about said circular ports, seat assemblies movably disposed within said seat recesses, a gate member having generally planar sealing surfaces thereon positioned within said valve chamber and being movable from a closed position where said gate member is positioned between the seat assemblies to block the flow of fluid through the valve to an open position where the gate member is substantially retracted within said bonnet to allow the flow of fluid through the valve, means for moving the gate, spacer means of the same thickness as the thickness of said gate member being positioned within said valve chamber and having at least a portion thereof interposed between and in contact with the lower portion of said seat assemblies, said spacer means adapted to maintain a predetermined minimum spaced relation between said seat assemblies, said gate member, seat assemblies and spacer member adapted for downstream axial movement as a unit by said fluid in the closed position of the valve.

14. A gate valve comprising a pair of spaced parallel slab portions each formed with a circular port and having means adapting the slab portions for connection to a pipeline, wall means interconnecting said slab portions and defining an open ended valve chamber, a removable bonnet forming a closure for the open end of said valve chamber, seat recesses formed in each of said slab portions about said circular ports, seat assemblies movably disposed within said seat recesses, a nonported gate member having generally planar parallel sealing surfaces thereon positioned within said valve chamber and being movable from a closed position where said gate member is positioned between the seat assemblies to block the flow of fluid through the valve to an open position where the gate member is substantially retracted within said bonnet to allow the flow of fluid through the valve, means for moving the gate, spacer means of the same thickness as the thickness of said gate positioned within said valve chamber and having at least a portion thereof interposed between and in contact with the lower portion of said seat assemblies, said spacer means adapted to maintain a predetermined minimum spaced relation between said seat assemblies, said gate member, seat assemblies and spacer member adapted for downstream axial movement as a unit by said fluid in the closed position of the valve, a sediment drain fitting fixed to the exterior of the valve and being in fluid communication with the valve chamber, means permitting the flow of fluid from the valve chamber to said drain fitting.

15. A fabricated gate valve comprising a pair of spaced parallel slab structural portions each formed with a circular port and having means adapting the slab portions for connection to a pipeline, a U-shaped wall interconnecting said slab portions and defining an open ended valve chamber, a removable bonnet forming a closure for the open end of said valve chamber, seat recesses formed in each of said slab portions about said circular ports, seat assemblies movably disposed within said seat recesses, a nonported gate member having generally planar parallel sealing surfaces thereon positioned within said valve chamber and being movable from a closed position where said gate member is positioned between the seat assemblies to block the flow of fluid through the valve to an open position where the gate member is substantially retracted within said bonnet and in contact with only a small upper portion of the seat assemblies thereby allowing the flow of fluid through the valve, means for moving the gate, spacer means of the same thickness as the thickness of said gate member positioned within said valve chamber and having opposed portions thereof interposed between and in contact with both of said seat assemblies at the lower portion thereof, said spacer means adapted to maintain a predetermined minimum spaced relation between said seat assemblies, said gate member, seat members and spacer member adapted for downstream axial movement as a unit by said fluid in the closed position of the valve, a sediment drain fitting fixed to the exterior of the valve and being in fluid communication with the valve chamber, means directing the flow of sediment within the valve to said sediment drain fitting.

16. A valve having a valve body formed with inlet and outlet ports and defining a valve chamber, a nonconduit valve member disposed within the valve chamber and being movable between open and closed positions to control the flow of fluid through the valve, a pair of resilient sealing members on opposite sides of the valve member for sealing engagement therewith, seat rings retained by the valve body about each of said ports, retainer rings slidably interfitting with each of said seat rings and defining annular recesses, said sealing members being retained in said recesses, said retainer rings defining the exterior periphery of said seat assemblies, a spacer member disposed between said seat assemblies and being in engagement only with said retainer members, whereby said spacer maintains predetermined minimum spacing between said seat assemblies and maintains the retainer rings in assembly with said seat rings.

17. A valve as recited in claim 16, said spacer member being disposed for axial movement within the valve body.

References Cited

UNITED STATES PATENTS

| | | | |
|---|---|---|---|
| 769,831 | 9/1904 | Ogden | 251—328 |
| 880,463 | 2/1908 | Paul | 251—328 |
| 2,931,394 | 4/1960 | Hamer | 251—328 X |
| 3,071,343 | 1/1963 | Milleville | 251—328 X |
| 3,203,442 | 8/1965 | Grove | 251—328 X |

FOREIGN PATENTS

| | | |
|---|---|---|
| 915,133 | 7/1954 | Germany. |

M. CARY NELSON, *Primary Examiner.*

HENRY T. KLINKSIEK, *Examiner.*